United States Patent
Schliwa-Bertling et al.

(10) Patent No.: US 10,143,001 B2
(45) Date of Patent: Nov. 27, 2018

(54) MPTCP SCHEDULING

(71) Applicant: TELEFONAKTIEBOLAGET L M ERICSSON (PUBL), Stockholm (SE)

(72) Inventors: Paul Schliwa-Bertling, Ljungsbro (SE); Michael Eriksson, Sollentuna (SE); Rashmi Purushothama, Sundbyberg (SE); Dinand Roeland, Sollentuna (SE); Jari Vikberg, Järna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 14/914,106

(22) PCT Filed: Aug. 29, 2013

(86) PCT No.: PCT/SE2013/051013
§ 371 (c)(1),
(2) Date: Feb. 24, 2016

(87) PCT Pub. No.: WO2015/030641
PCT Pub. Date: Mar. 5, 2015

(65) Prior Publication Data
US 2016/0212759 A1 Jul. 21, 2016

(51) Int. Cl.
*H04L 29/08* (2006.01)
*H04L 12/707* (2013.01)
(Continued)

(52) U.S. Cl.
CPC ......... *H04W 72/1215* (2013.01); *H04L 45/24* (2013.01); *H04L 45/245* (2013.01);
(Continued)

(58) Field of Classification Search
CPC ..... H04L 69/14; H04L 69/163; H04L 47/193; H04L 45/245; H04W 40/12; H04W 76/027; H04W 24/04; H04W 40/36
See application file for complete search history.

(56) References Cited

U.S. PATENT DOCUMENTS

2012/0144062 A1* 6/2012 Livet .................. H04L 45/24
709/239
2012/0188949 A1 7/2012 Salkintzis et al.
(Continued)

FOREIGN PATENT DOCUMENTS

CN 102185771 A 9/2011
EP 2538637 A2 12/2012
(Continued)

OTHER PUBLICATIONS

Ford, et al., TCP Extensions for Multipath Operation with Multiple Addresses, RFC 6824, Jan. 2013.
(Continued)

*Primary Examiner* — Gbemileke J Onamuti
(74) *Attorney, Agent, or Firm* — Boisbrun Hofman, PLLC (57) ABSTRACT

The present disclosure relates to a method performed in a Multipath Transmission Control Protocol (MPTCP) scheduler which is scheduling a TCP flow between a first peer and an MPTCP capable second peer. The method comprises setting up the TCP flow comprising at least two sub-flows connecting the MPTCP capable second peer, each sub-flow being associated with an address for the MPTCP capable second peer. The method also comprises receiving external information relating to at least one of the at least two sub-flows. The method also comprises scheduling data in the TCP flow based on the received external information, wherein the scheduling comprises choosing which sub-flow or sub-flows of the at least two sub-flows to schedule the data via, based on the received external information. The (Continued)

present disclosure also relates to an MPTCP scheduler as well as an MPTCP proxy and an MPTCP capable peer comprising such a scheduler.

17 Claims, 6 Drawing Sheets

(51) Int. Cl.
| | |
|---|---|
| H04W 72/12 | (2009.01) |
| H04L 29/06 | (2006.01) |
| H04W 40/12 | (2009.01) |
| H04L 12/709 | (2013.01) |
| H04L 12/801 | (2013.01) |
| H04W 24/04 | (2009.01) |
| H04W 40/36 | (2009.01) |
| H04W 72/00 | (2009.01) |
| H04W 76/18 | (2018.01) |

(52) U.S. Cl.
CPC ........ *H04L 47/193* (2013.01); *H04L 67/1078* (2013.01); *H04L 69/14* (2013.01); *H04L 69/163* (2013.01); *H04W 24/04* (2013.01); *H04W 40/12* (2013.01); *H04W 40/36* (2013.01); *H04W 72/005* (2013.01); *H04W 76/18* (2018.02)

(56) References Cited

U.S. PATENT DOCUMENTS

| | | | |
|---|---|---|---|
| 2012/0258674 A1* | 10/2012 | Livet | H04B 1/38 455/73 |
| 2013/0064198 A1* | 3/2013 | Krishnaswamy | H04W 76/025 370/329 |
| 2013/0114481 A1 | 5/2013 | Kim et al. | |
| 2013/0279331 A1* | 10/2013 | Pluntke | H04L 45/24 370/230 |

FOREIGN PATENT DOCUMENTS

| | | |
|---|---|---|
| WO | 2012095704 A1 | 7/2012 |
| WO | 2012106032 A1 | 8/2012 |

OTHER PUBLICATIONS

IEEE Std 802.11r-2008, IEEE Standard for Information technology—Telecommunications and information exchange between systems—Local and metropolitan area networks—Specific requirements: Part 11: Wireless LAN Medium Access Control (MAC) and Physical Layer (PHY) Specifications, Amendment 2: Fast Basic Service Set (BSS) Transition, Jul. 15, 2008.
3GPP TS 36.300 V11.6.0, 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 11), Jun. 2013, p. 64-68.

* cited by examiner

MPTCP SCHEDULING

This application is a 371 of International Application No. PCT/SE2013/051013, filed Aug. 29, 2013, the disclosure of which is fully incorporated herein by reference.

TECHNICAL FIELD

The present disclosure relates to a method and devices for Multipath Transmission Control Protocol (MPTCP) scheduling between peers.

BACKGROUND

Many hosts today are multi-homed. Hence, they have multiple paths for connectivity via one or more access technologies. Regular Transmission Control Protocol (TCP)/Internet Protocol (IP) communications restrict these multi-homed hosts to use only one of the available interfaces/paths per session, where path is defined as an (source, destination) IP address pair. Internet Engineering Task Force (IETF) is currently looking into a mechanism which uses multiple paths between the communicating peers simultaneously during a communication session. IETF Request for Comments (RFC) number 6824 proposes a set of extensions to traditional TCP for multipath operations when multiple addresses are available. This is referred to as Multipath TCP (MPTCP).

Figure 1:
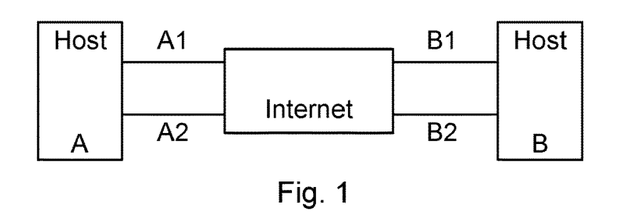
FIG. 1 is a schematic block diagram illustrating an embodiment of a communication between two host peers over the Internet.

The advantages of using multiple paths concurrently are:
1 Improve network resource utilization (e.g., increase bandwidth due to resource pooling)
2 Improve user experience through higher throughput
3 Allows failover from one interface to another (e.g., mobile client)
4 Allows a single data connection to use several interfaces simultaneously A usage scenario for MPTCP is illustrated in FIG. 1 where two communicating hosts A and B are multi-homed and multi-addressed. Each host provides two separate connections to the Internet offering four different paths between them (A1-B1, A1-B2, A2-B1 and A2-B2).

A traditional TCP connection between the hosts A and B will make use of only one of the available paths whereas MPTCP connection makes use of all the four available paths between hosts A and B. An MPTCP connection is similar to a regular TCP connection and is defined in RFC 6824 as a set of one or more sub-flows, over which an application can communicate between two hosts. A "sub-flow" is defined in RFC 6824 as a flow of TCP segments operating over an individual path, which forms part of a larger MPTCP connection. A sub-flow is started and terminated similar to a regular TCP connection.

MPTCP is an end-to-end protocol which requires both hosts to support MPTCP to benefit from MPTCP. Since, MPTCP is still in its early stage of deployment, probabilities that every host on the Internet supports MPTCP are very low. To overcome this problem and benefit from MPTCP even though both communicating hosts do not support MPTCP, an MPTCP proxy may be used to convert MPTCP flows to TCP and vice versa.

Figure 2:
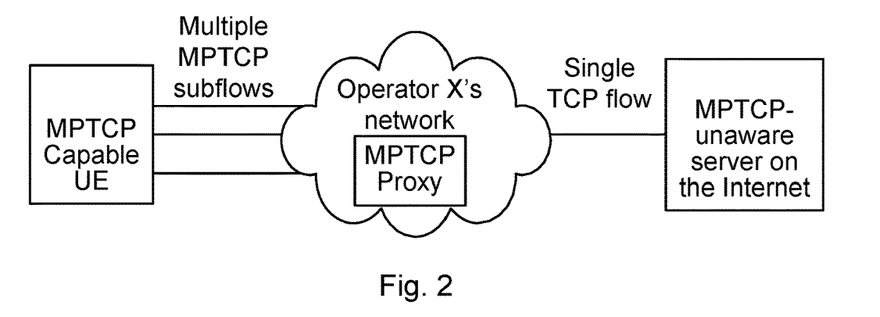
FIG. 2 is a schematic block diagram illustrating another embodiment of a communication between two host peers over the Internet via an MPTCP proxy.

One use case is illustrated in FIG. 2. An MPTCP-capable User Equipment (UE) (cf. Host A in FIG. 1) is controlled by the operator and sets up several MPTCP sub-flows to the MPTCP proxy placed in the operator's network. This proxy in turn sets up a single TCP flow to a server on the Internet (cf. Host B in FIG. 1 which is instead MPTCP capable and does not need an MPTCP proxy) which is not MPTCP capable. In the described scenario, the UE which supports MPTCP can still get the benefits of MPTCP although the server at the other end is not aware of MPTCP.

So a main principle of Multi-Path TCP (MPTCP) is to aggregate a set of TCP connections e.g. over different wireless interfaces such as a cellular Third Generation Partnership Program (3GPP) Radio Access Network (RAN) and Wireless Local Area Network (WLAN) RAN (e.g. Wi-Fi) (or even different simultaneous cellular 3GPP accesses). MPTCP has multiple sub-flows and is capable of distributing load on all sub-flows. Since the multiplexing of different connections is on TCP level, it allows separate congestion control for each sub-flow.

Figure 3A:
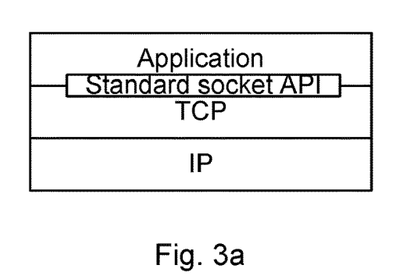
FIG. 3a schematically illustrates a protocol stack of a peer for TCP communication.
Figure 3B:
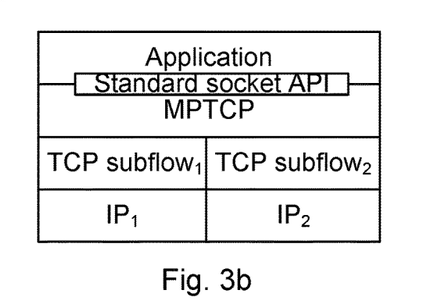
FIG. 3b schematically illustrates a protocol stack of a peer for MPTCP communication.

FIGS. 3a and 3b show the differences between standard TCP and MPTCP protocol stacks. The application interface, i.e. the socket API, is unchanged and the main changes are between this API and the IP-layer. The TCP and IP layers in the protocol stack are split between the different sub-flows.

Figure 4:
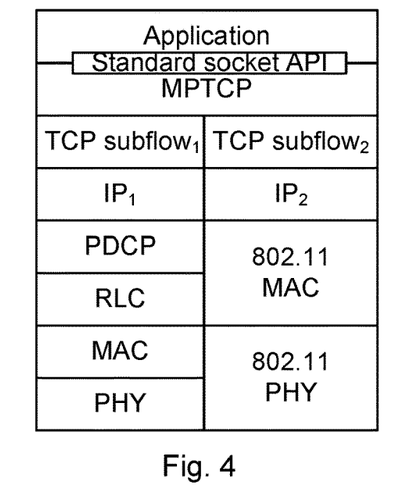
FIG. 4 schematically illustrates a protocol stack of a peer for MPTCP communication via two parallel sub-flows.

MPTCP provides the possibility to fully and maximally utilize the different TCP sub-flows. For example, in the case of one TCP sub-flow on 3GPP access and another one on Wi-Fi access, the total throughput could be the sum of these sub-flows. FIG. 4 shows a user plane protocol architecture example for the case when MPTCP would be utilizing 3GPP Long Term Evolution (LTE) and WLAN/Wi-Fi simultaneously.

In an exemplary case of MPTCP, the UE is simultaneously connected to both LTE and Wi-Fi/WLAN. The application in the UE has opened up one TCP socket and is sending a stream of bytes on the internal API. The MPTCP layer (also called MPTCP scheduler) has established two different TCP sub-flows, sub-flow 1 via WLAN/Wi-Fi and sub-flow 2 via LTE. Both these sub-flows are towards an MPTCP Proxy that further communicates with another server using plain TCP. The MPTCP scheduler is the function that decides how the different packets are mapped to the two sub-flows. There may be one MPTCP scheduler in the UE for uplink scheduling and one in the MPTCP proxy for downlink scheduling. The MPTCP scheduler is for example applying "round-robin" scheduling i.e. first TCP segment is sent on sub-flow 2, second on sub-flow 1, third again on sub-flow 2 etc. Another example is that the MPTCP scheduler uses the sub-flow with the shortest round-trip time (RTT). Such an approach is typically used in today's MPTCP kernel prototype implementations.

SUMMARY

The current behaviour of MPTCP is that the MPTCP scheduler provides its internal algorithm when deciding on which sub-flow a TCP segment (herein also more generally called a TCP packet) should initially be sent. If there is no acknowledgement (ACK) on a TCP segment via that sub-flow, then the MPTCP scheduler can try to re-send that TCP segment on another sub-flow. This leads to unfortunate delays due to waiting for an ACK before re-sending. A typical MPTCP proxy scheduling implementation reflects only on the local knowledge. The packet scheduling function breaks the byte stream received from the application into segments and transmits them on one of the available sub-flows. Depending on how much data is queued to be sent, the scheduler either selects only one sub-flow, e.g. the one with the shortest RTT (if there is not enough data) or it uses all available sub-flows (when there is even more data to be sent). In the latter case, the sub-flow with most available bandwidth will be used more often by the scheduler in case of bulk data transfers. Further, the current behaviour of MPTCP in relation to radio-level handovers (HO) in e.g. 3GPP or Access Point (AP)-to-AP handover in WLAN may result in unnecessary retransmissions. If for example an intra-LTE radio-level handover would take place and is not be packet-loss free, then a retransmission on any of the sub-flows would need to take place. Another example is if the UE is about to lose Wi-Fi connectivity. If the MPTCP layer is unaware of this, it would just continue to send data over the Wi-Fi sub-flow. It would not receive an acknowledgement and conclude that the Wi-Fi sub-flow should not be used anymore. This process takes at least one RTT. It would therefore be beneficial for the MPTCP layer to know in advance when Wi-Fi will be lost. A problem with a current scheduler design which only takes local, per-host, knowledge into account when making decisions, is that this optimizes throughput for one particular peer, but may not optimize the throughput for the communication network as a whole, including a set of peers served by the MPTCP proxy.

It is an objective of the present disclosure to provide improved MPTCP communication in view of the above mentioned problems in the art.

According to an aspect of the present disclosure, there is provided a method performed in an MPTCP scheduler which is scheduling a TCP flow between a first peer and an MPTCP capable second peer. The method comprises setting up the TCP flow comprising at least two sub-flows connecting the MPTCP capable second peer, each sub-flow being associated with an address for the MPTCP capable second peer. The method also comprises receiving external information relating to at least one of the at least two sub-flows. The method also comprises scheduling data in the TCP flow based on the received external information, wherein the scheduling comprises choosing which sub-flow or sub-flows of the at least two sub-flows to schedule the data via, based on the received external information.

According to another aspect of the present disclosure, there is provided a computer program product comprising computer-executable components for causing an MPTCP scheduler to perform an embodiment of the method of the present disclosure when the computer-executable components are run on processor circuitry comprised in the MPTCP scheduler.

According to another aspect of the present disclosure, there is provided an MPTCP scheduler configured for scheduling a TCP flow between a first peer and an MPTCP capable second peer. The scheduler comprises processor circuitry, and a storage unit storing instructions that, when executed by the processor circuitry, cause the scheduler to set up the TCP flow comprising at least two sub-flows connecting the MPTCP capable second peer, each sub-flow being associated with an address for the MPTCP capable second peer. The instructions also cause the scheduler to receive external information relating to at least one of the at least two sub-flows. The instructions also cause the scheduler to schedule data in the TCP flow based on the received external information, wherein the scheduling comprises choosing which sub-flow or sub-flows of the at least two sub-flows to schedule the data via, based on the received external information.

According to another aspect of the present disclosure, there is provided an MPTCP proxy comprising an embodiment of the MPTCP scheduler of the present disclosure.

According to another aspect of the present disclosure, there is provided a communication network comprising an MPTCP proxy comprising an embodiment of the MPTCP scheduler of the present disclosure, and a RAN configured for providing a sub-flow in a TCP flow via the MPTCP proxy to each of a plurality of peers connected to the RAN.

According to another aspect of the present disclosure, there is provided an MPTCP capable second peer comprising an embodiment of the MPTCP scheduler of the present disclosure.

According to another aspect of the present disclosure, there is provided a computer program for scheduling a TCP flow. The computer program comprises computer program code which is able to, when run on processor circuitry of an MPTCP scheduler, causes the MPTCP scheduler to set up the TCP flow comprising at least two sub-flows to an MPTCP capable second peer, each sub-flow being associated with an address for the MPTCP capable second peer. The code is also able to cause the scheduler to receive external information relating to at least one of the at least two sub-flows. The code is also able to cause the scheduler to schedule data in the TCP flow based on the received external information, wherein the scheduling comprises choosing which sub-flow or sub-flows of the at least two sub-flows to schedule the data via, based on the received external information.

According to another aspect of the present disclosure, there is provided a computer program product comprising an embodiment of the computer program of the present disclosure and a computer readable means on which the computer program is stored.

In accordance with the present disclosure, the MPTCP capable second peer is thus connected via a plurality of sub-flows (also called paths), regardless of the number of sub-flows connecting the first peer. The addresses may be e.g. an IP address or an IP address in combination with a TCP port. The first peer may e.g. be a server or host connectable via the Internet. The TCP flow may alternatively be called a TCP session. The TCP flow may in some embodiments be set up via an MPTCP proxy, as discussed further below, while in other embodiments both the first and second peers are MPTCP capable and no MPTCP proxy is needed.

It is advantageous that, in accordance with the present disclosure, the MPTCP scheduling can be done in view of received external information about the sub-flows instead of only operating in accordance with a preprogrammed set of internal rules as is currently the case. By means of the external information, the scheduler can e.g. better optimize the overall throughput and/or cost in the communication network. The external information may e.g. include information about RAN capabilities and properties of the MPTCP capable peer and/or preferences of the network operator.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated. The use of "first", "second" etc. for different features/components of the present disclosure are only intended to distinguish the features/components from other similar features/components and not to impart any order or hierarchy to the features/components.

BRIEF DESCRIPTION OF THE DRAWINGS

Embodiments will be described, by way of example, with reference to the accompanying drawings, in which.

DETAILED DESCRIPTION

Embodiments will now be described more fully hereinafter with reference to the accompanying drawings, in which certain embodiments are shown. However, other embodiments in many different forms are possible within the scope of the present disclosure. Rather, the following embodiments are provided by way of example so that this disclosure will be thorough and complete, and will fully convey the scope of the disclosure to those skilled in the art. Like numbers refer to like elements throughout the description.

Figure 5:
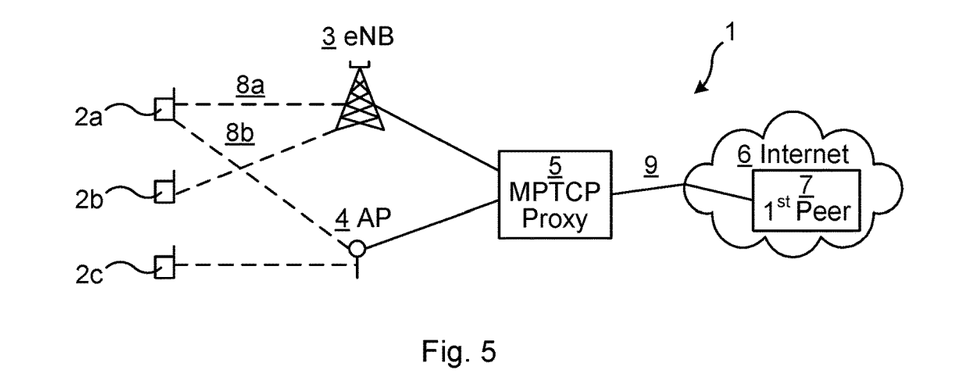
FIG. 5 is a schematic block diagram of an embodiment of a communication network of the present disclosure.

FIG. 5 schematically illustrates an embodiment of a communication network 1 of the present disclosure. A plurality of peers 2 ate connected to the Internet 6 via an MPTCP proxy 5. Each of the peers 2 may e.g. be a radio device or UE, mobile or stationary, enabled to communicate over a radio channel in a communications network 1, for instance but not limited to e.g. mobile phone, smart phone, modem, sensors, meters, vehicles, household appliances, medical appliances, media players, cameras, or any type of consumer electronic, for instance but not limited to television, radio, lighting arrangements, tablet computer, laptop, or personal computer (PC). Some or all of the peers 2 may be MPTCP capable and are herein called second peer(s) 2 to distinguish them from the first peer 7 with which they can communicate via the MPTCP proxy 5 and the IP network 6. In the embodiment of FIG. 5, there are two different RAN:s available, a cellular 3GPP RAN 3 (in the figure represented by an LTE evolved Node B, eNB), and a WLAN RAN 4 represented by a WLAN access point (AP). In FIG. 5, peer 2C is only connected to the internet 6 via the AP 4, while peer 2b is only connected with the internet 6 via the eNB 3. In contrast, peer 2a is connected to the internet 6 via both the eNB 3 and the AP 4, i.e. via two different RAN:s. Thus, the MPTCP capable peer 2a is connected via two different paths and can support two different sub-flows 8, here called 8a via the eNB 3 and 8b via the AP 4, in an MPTCP flow/session in communicating with the first peer 7 via the MPTCP proxy 5. Further path(s)/sub-flow(s) are also possible for peer 2a, e.g. via a Wideband Code Division Multiple Access (WCDMA) RAN. The first peer, however, is connected via only one TCP path/sub-flow 9 with the MPTCP proxy 5, possibly because the $1^{st}$ peer 7 is not MPTCP capable.

Figure 6:
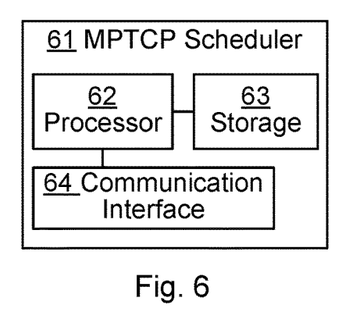
FIG. 6 is a schematic block diagram of an embodiment of an MPTCP scheduler of the present disclosure.

FIG. 6 schematically shows an embodiment of an MPTCP scheduler 61. The MPTCP scheduler 61 comprises processor circuitry 62 e.g. a central processing unit (CPU). The processor circuitry 62 may comprise one or a plurality of processing units in the form of microprocessor(s). However, other suitable devices with computing capabilities could be comprised in the processor 62, e.g. an application specific integrated circuit (ASIC), a field programmable gate array (FPGA) or a complex programmable logic device (CPLD). The processor 62 is configured to run one or several computer program(s) or software stored in a storage unit 63 e.g. a memory. The storage unit is regarded as a computer readable means and may e.g. be in the form of a Random Access Memory (RAM), a Flash memory or other solid state memory, or a hard disk, or be a combination thereof. The processor circuitry 62 is also configured to store data in the storage unit 63, as needed. The MPTCP scheduler 61 also comprises a communication interface 64, configured for e.g. receiving external information in accordance with the present disclosure and transmitting scheduling commands.

Figure 7:
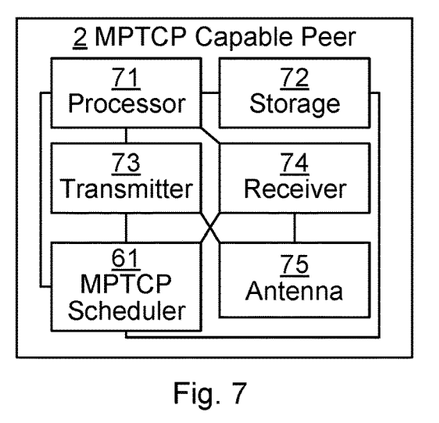
FIG. 7 is a schematic block diagram of an embodiment of an MPTCP capable peer of the present disclosure.

FIG. 7 schematically shows an embodiment of an MPTCP capable peer 2. The MPTCP capable peer 2 comprises processor circuitry 71 e.g. a central processing unit (CPU). The processor circuitry 71 may comprise one or a plurality of processing units in the form of microprocessor(s). However, other suitable devices with computing capabilities could be comprised in the processor 71, e.g. an application specific integrated circuit (ASIC), a field programmable gate array (FPGA) or a complex programmable logic device (CPLD). The processor 71 is configured to run one or several computer program(s) or software stored in a storage unit 72 e.g. a memory. The storage unit is regarded as a computer readable means and may e.g. be in the form of a Random Access Memory (RAM), a Flash memory or other solid state memory, or a hard disk, or be a combination thereof. The processor circuitry 71 is also configured to store data in the storage unit 72, as needed. The MPTCP capable peer 2 also comprises a transmitter 73, a receiver 74 and an antenna 75, which may be combined to form a transceiver or be present as distinct units within the MPTCP capable peer 2. The transmitter 73 is configured to cooperate with the processor circuitry to transform data bits to be transmitted over a radio interface to a suitable radio signal in accordance with the radio access technology (RAT) used by the RAN 3 and/or 4 via which the data bits are to be transmitted. The receiver 74 is configured to cooperate with the processor circuitry 71 to transform a received radio signal to data bits. The antenna 75 may comprise a single antenna or a plurality of antennas, e.g. for different frequencies and/or for MIMO (Multiple Input Multiple Output) communication. The antenna 75 is used by the transmitter 73 and the receiver 74 for transmitting and receiving, respectively, radio signals. If the scheduling apparatus 61 is integrated or otherwise associated with the MPTCP capable peer 2, the processor 71 of the MPTCP capable peer 2 may also function as or comprise the processor 62 of the scheduler 61, the storage unit 72 of the MPTCP capable peer 2 may also function as or comprise the storage unit 63 of the scheduler 61 and/or the transmitter 73 and the receiver 74 of the MPTCP capable peer 2 may also be part of or associated with the communication interface 64 of the scheduler 61.

Figure 8:
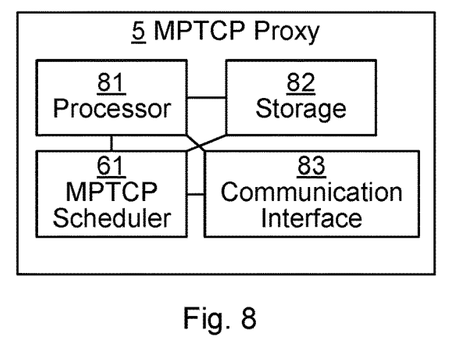
FIG. 8 is a schematic block diagram of an embodiment of an MPTCP proxy of the present disclosure.

FIG. 8 schematically shows an embodiment of an MPTCP proxy 5. The MPTCP proxy 5 comprises processor circuitry 81 e.g. a central processing unit (CPU). The processor circuitry 81 may comprise one or a plurality of processing units in the form of microprocessor(s). However, other suitable devices with computing capabilities could be comprised in the processor 81, e.g. an application specific integrated circuit (ASIC), a field programmable gate array (FPGA) or a complex programmable logic device (CPLD). The processor 81 is configured to run one or several computer program(s) or software stored in a storage unit 82 e.g. a memory. The storage unit is regarded as a computer readable means and may e.g. be in the form of a Random Access Memory (RAM), a Flash memory or other solid state memory, or a hard disk, or be a combination thereof. The processor circuitry 81 is also configured to store data in the storage unit 82, as needed. The MPTCP proxy 5 also comprises a communication interface 83, configured for e.g. receiving messages from the MPTCP capable peer 2 and transmitting messages towards the first peer 7, and vice versa. If the scheduling apparatus 61 is integrated or otherwise associated with the MPTCP proxy 5, the processor 81 of the MPTCP proxy 5 may also function as or comprise the processor 62 of the scheduler 61, the storage unit 82 of the MPTCP proxy 5 may also function as or comprise the storage unit 63 of the scheduler 61 and/or the communication interface 83 of the MPTCP proxy 5 may also function as or comprise the communication interface 64 of the scheduler 61.

Figure 9:
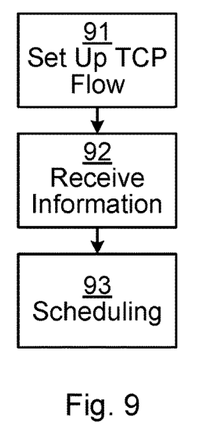
FIG. 9 is a schematic flow chart of an embodiment of a method of the present disclosure.

FIG. 9 is a schematic flow chart of an embodiment of a method of the present disclosure. The method is performed in/by an MPTCP scheduler 61, e.g. integrated in an MPTCP capable peer 2 or an MPTCP proxy 5, as discussed herein. The scheduler is configured for scheduling a TCP flow between a first peer 7 and an MPTCP capable second peer 2. A TCP flow is set up 91, comprising at least two sub-flows 8 connecting the MPTCP capable second peer 2, each sub-flow being associated with an address for the MPTCP capable second peer. The TCP flow may be set up 91 in a conventional manner for establishing a communication path between the first peer 7 and the MPTCP capable second peer 2. Since the second peer 2 is MPTCP capable, a plurality of sub-flows (8) can be set up. If the first peer 7 is not MPTCP capable, the TCP flow may be set up 91 with only one path/sub-flow (8) to the first peer 7. The MPTCP scheduler 61 receives 92 external information relating to at least one of the at least two sub-flows 8. The external information may be received 92 before, during or after setting up 91 the TCP flow. The external information is received from outside of the scheduler 61, e.g. from the MPTCP capable peer 2 or from a network operator of the communication network 1 via which the TCP flow is set up 91. Then, data in the TCP flow is scheduled 93 based on the received 92 external information. The scheduling 93 comprises choosing which sub-flow or sub-flows of the at least two sub-flows 8 to schedule the data via, based on the received 92 external information. In case of two different sub-flows 8 in FIG. 5, corresponding to two different addresses for the MPTCP capable peer 2, the scheduler 61 may thus, based on received 92 external information, opt to schedule 93 the data to be transmitted in the TCP flow via either the via the sub-flow 8a over the LTE RAN 3, via the sub-flow 8b over the WLAN RAN 4, or via both the sub-flows 8a and 8b e.g. to maximize the bandwidth of the TCP flow.

In some embodiments, the receiving 92 external information comprises receiving information that one of the at least two sub-flows 8 is costly, and the scheduling 93 comprises avoiding scheduling the data via the costly sub-flow. If e.g. the MPTCP capable second peer 2 is close to a cell border in a cellular RAN 3, much transmission power (i.e. higher cost) may be needed to communicate with it over the cellular RAN 3, why it may be preferable to primarily schedule the second peer 2 via another sub-flow 8, e.g. over the WLAN RAN 4, and free-up resources in the cellular RAN for other second peers 2 which require a lower transmission power and/or which are not capable to communicate via the WLAN RAN 4. The overall cost of the communication network 1 may thus be reduced. This external information may e.g. be sent to the scheduler 61 from the second peer 2 or the cellular RAN 3.

In some embodiments, the receiving 92 external information comprises receiving information that a specified sub-flow type is preferred, and the scheduling 93 comprises, if at least one of the at least two sub-flows 8 is of the specified sub-flow type, scheduling the data via a sub-flow of the at least two sub-flows which is of the specified path type. For example, the type may be RAN type, e.g. cellular or WLAN, or type of cellular RAN e.g. LTE or WCDMA. This external information may e.g. be provided from a network operator or a service provider in the communication network 1. For instance, the network operator can instruct the scheduler 61 to primarily use WLAN if available, in order to reduce cost and to reduce the load on the cellular RAN.

In some embodiments, the receiving (92) external information comprises receiving information that a specified sub-flow type is preferred for a specified type of data, and the scheduling (93) comprises, if at least one of the at least two sub-flows (8) is of the specified sub-flow type and at least some of the data to be scheduled is of the specified data type, scheduling the data of the specified data type via a sub-flow of the at least two sub-flows which is of the specified sub-flow type. This external information may e.g. be provided by a network operator. Thus, the operator may e.g. instruct the scheduler 61 about which type of data (e.g. data from certain services, or media data or real-time data, or such) should preferably be sent via e.g. cellular RAN 3 or WLAN 4. Real-time data may e.g. preferably be scheduled 93 via a sub-flow 8 with a lower RTT, while the load of such low RTT sub-flow may be reduced by scheduling 93 less time sensitive data via another sub-flow which has a longer RTT.

In some embodiments, the receiving 92 external information comprises receiving information that one of the at least two sub-flows 8 has been or will be terminated, e.g. due to a handover or a link failure. By receiving 92 this type of external information, the scheduler 6i may be able to send data (comprised in TCP packets e.g. TCP segments) via another sub-flow, without having to wait for a TCP acknowledgement (TCP ACK) for sent data which has been lost due to the sub-flow having been terminated. In some embodiments, the scheduling 93, based on the received 92 information of the sub-flow termination, comprises that the MPTCP scheduler 6i initiates multi-casting so that TCP packet(s) of the TCP flow are sent temporarily via a plurality of the sub-flows 8. For instance, if there are two sub-flows 8, the scheduler 6i may schedule dual-casting over both sub-flows in order to find out which one works or works best, without loosing time trying one sub-flow after the other. In another example, when there are three sub-flows 8 and a handover is taking place on a first sub-flow, then the multicasting may take place for example on only the first and a second sub-flow, or if one of the three sub-flows is lost due to a link failure then multicasting may take place on the two remaining sub-flows to determine the most suitable one. In some embodiments, the scheduling 93, based on the received 92 information of the sub-flow termination, comprises that the MPTCP scheduler 6i reduces or minimizes the usage of the one of the at least two sub-flows 8. Thus, the loss and re-sending of data may be reduced when the sub-flow is terminated since less data has been scheduled on that sub-flow. In some embodiments, the scheduling 93, based on the received 92 information of the sub-flow termination, comprises that the MPTCP scheduler 61 stops using the one of the at least two sub-flows 8. Thus, the scheduler may anticipate the termination and stops using the sub-flow without having to wait for an ACK which will not be received. In some embodiments, the scheduling 93, based on the received 92 information of the sub-flow termination, comprises that the MPTCP scheduler 61 re-sends TCP packet(s) already sent via the one of the at least two sub-flows 8 via another of the at least two sub-flows 8 without waiting for a time-out of acknowledgement of the already sent TCP packet(s).

In some embodiments, the MPTCP scheduler 61 is part of an MPTCP proxy 5, and the scheduling 93 comprises scheduling downlink (DL) data to the MPTCP capable second peer 2 in the TCP flow. For DL scheduling, the scheduler may conveniently be integrated in the proxy 5. In some embodiments, the setting up 91 the TCP flow comprises setting up said TCP flow with only one sub-flow 9 between the MPTCP proxy 5 and the first peer 7. This is suitable e.g. if the first peer 7 is not MPTCP capable. By means of the proxy 5, a plurality of MPTCP sub-flows may still be set up 91 to the MPTCP capable second peer 2. In some embodiments, the MPTCP proxy 5 additionally handles a plurality of additional TCP flows to a plurality of additional peers, e.g. other MPTCP capable peers 2 and/or first peers 7. The same proxy 5 may thus be used for a plurality of TCP flows using MPTCP.

In some embodiments, the MPTCP scheduler 6i is part of the MPTCP capable second peer 2, and the scheduling 93 comprises scheduling uplink (UL) data from the MPTCP capable second peer 2 in the TCP flow. For scheduling of UL data, the scheduler may conveniently be integrated in the MPTCP capable second peer 2.

In some embodiments, as also discussed above, at least one of the at least two sub-flows 8 comprises a WLAN RAN 4 (cf. sub-flow 8b in FIG. 5).

In some embodiments, as also discussed above, at least one of the at least two sub-flows 8 comprises a cellular RAN 4 (cf. sub-flow 8a in FIG. 5).

EXAMPLES

Rather than optimizing performance per peer, the scheduler 61 may achieve a better system-level performance when taking into account external inputs. Herein are describes different ways of doing such scheduling in an MPTCP proxy 5 maintained by an operator by describing examples.

The scheduler in an MPTCP proxy can get different external information input to make system-level optimized scheduling decisions. Example inputs are:
 1. Input from RAT (e.g. 3GPP RAN and Wi-Fi)
 2. Input about available paths 8 to the MPTCP capable peers 2
 3. Input about routing policies
There may be other external information that is relevant to make system-level optimized scheduling decision.

Example 1—External Information from RAT (3GPP RAN and Wi-Fi)

Figure 10:
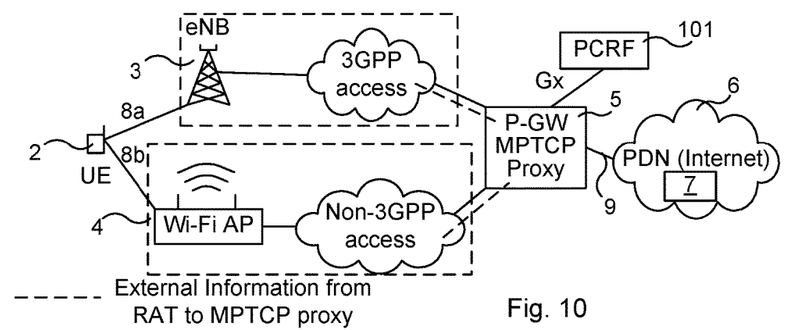
FIG. 10 is a schematic block diagram of an example embodiment of a communication network of the present disclosure.

The RAT can provide input/feedback to the MPTCP proxy 5 and the scheduler 61 in the MPTCP proxy can use this information to take system-level optimized scheduling decisions as illustrated in FIG. 10. In the figure, an MPTCP capable peer 2 is connected with an MPTCP proxy 5 via two sub-flows 8, one 8a over a cellular RAN 3, and one 8b over a Wi-Fi 4. A single flow/sub-flow 9 connects the proxy 5 with the internet 6 and the first peer 7 (FIG. 5). Paths for external information input from the respective RAN:s 3 and 4 are given as dashed lines in the figure. The figure also shows a policy charging and rules function (PCRF) 101 and its interface Gx with the MPTCP proxy 5.

The MPTCP proxy 5 is in this example located in the packet data network (PDN) gateway (P-GW) in the 3GPP network. The peers 2 that are at the edge of a RAT cell (either a 3GPP RAT cell like LTE or a Wi-Fi cell) may experience very bad throughput due to poor signal strength. In order to provide decent bandwidth to such peers, it requires extra power which might be very costly to the operators. The information about such peers 2 who are at the end of a RAT cell can be directed to and received 92 by the MPTCP scheduler 61. The MPTCP scheduler can then take decision and set preference for such peers to use an alternative sub-flow 8 if available.

For e.g. if an eNodeB sends information about the peers 2 that are at the cell edge and utilizing more resources, the MPTCP scheduler 61 can then set Wi-Fi as preferred sub-flow 8 to these peers.

Similarly, a Wi-Fi AP can send information about the peers 2 at the Wi-Fi cell edge who do not have a good coverage and the MPTCP scheduler 61 can then prefer to use 3GPP RAN 3 over Wi-Fi 4 for these peers 2.

Example 2—External Information about Available Paths to the Peers is Present in the P-GW If the MPTCP proxy 5 can get information about the available paths/sub-flows 8 to the MPTCP capable peers 2, the scheduler 61 can use this information to distribute peers 2 uniformly depending on the number of sub-flows 8 each user has.

Consider a scenario where all the peers 2 in a particular LTE cell are getting very low bandwidth (say 1 Mbps) and some of these peers 2 have both LTE and Wi-Fi access/sub-flow 8. The P-GW in the 3GPP network is aware of the peers 2 having more than one access. So, the scheduler 61 in the MPTCP proxy 5 which sits in the P-GW can use this information and set Wi-Fi as a preferred sub-flow 8 to such peers 2 who have both LTE and Wi-Fi capabilities. Also, if some peers 2 have lots of bandwidth over Wi-Fi, the scheduler could stop using LTE for such peers 2, so that other peers 2 who have only LTE sub-flow can get better bandwidth. This type of resource sharing will improve the overall system performance rather than for a particular peer 2.

Example 3—Input about Routing Policies

An MPTCP proxy scheduler 61 could improve overall system performance by applying operator-controlled routing policies. Such policies may be pre-configured in the scheduler, or access network discovery and selection function (ANDSF) 111 input can be fed to the MPTCP scheduler. ANDSF rules for MPTCP scheduling could be very similar to the existing inter-system routing policy (ISRP) rules.

Figure 11:
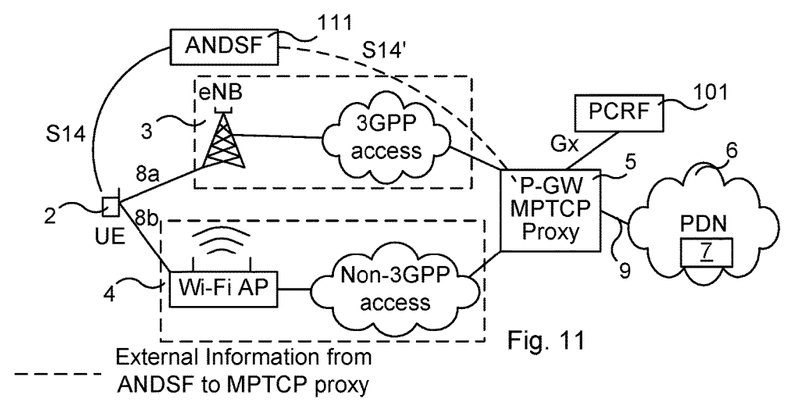
FIG. 11 is a schematic block diagram of another example embodiment of a communication network of the present disclosure.

This would require a new interface between MPTCP proxy 5 and ANDSF 111. This could basically be a copy of the existing 3GPP S14 interface between ANDSF 111 and the MPTCP capable peer 2 (called UE in FIGS. 10-12). This is illustrated in FIG. 11, where this new interface is called S14' (S14 prime).

Figure 12:
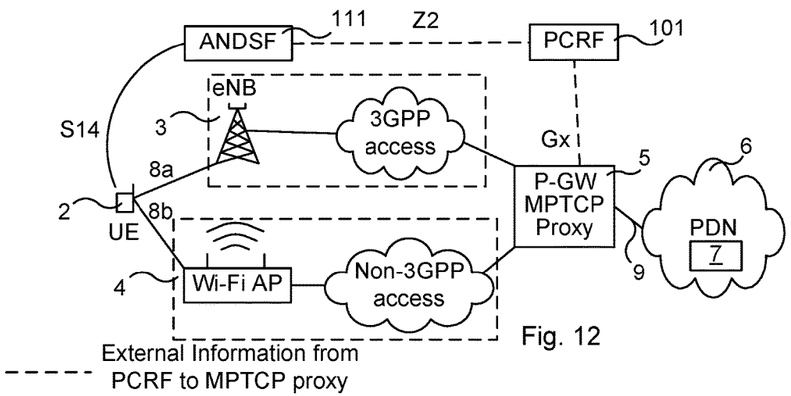
FIG. 12 is a schematic block diagram of another example embodiment of a communication network of the present disclosure.

Alternatively, no new interface is defined. Instead, relevant information is sent to the PCRF 101 from the ANDSF 111 via a proprietary interface Z2 in a vendor-specific way and sent from PCRF 101 to the P-GW via (vendor-specific) extensions to Gx. This alternative would in particular apply if the proxy 5 is co-located on the P-GW. This approach is illustrated in FIG. 12. Alternatively, the relevant information may originate from the PCRF 101, and thus not first sent from the ANDSF 111.

The MPTCP proxy scheduler 61 may then apply operator-controlled policies stored in the ANDSF 111. For a particular peer 2, E.g. YouTube traffic is to be sent only over Wi-Fi, voice is to be sent over LTE.

Example 4—Radio-Level Handovers

Figure 13:
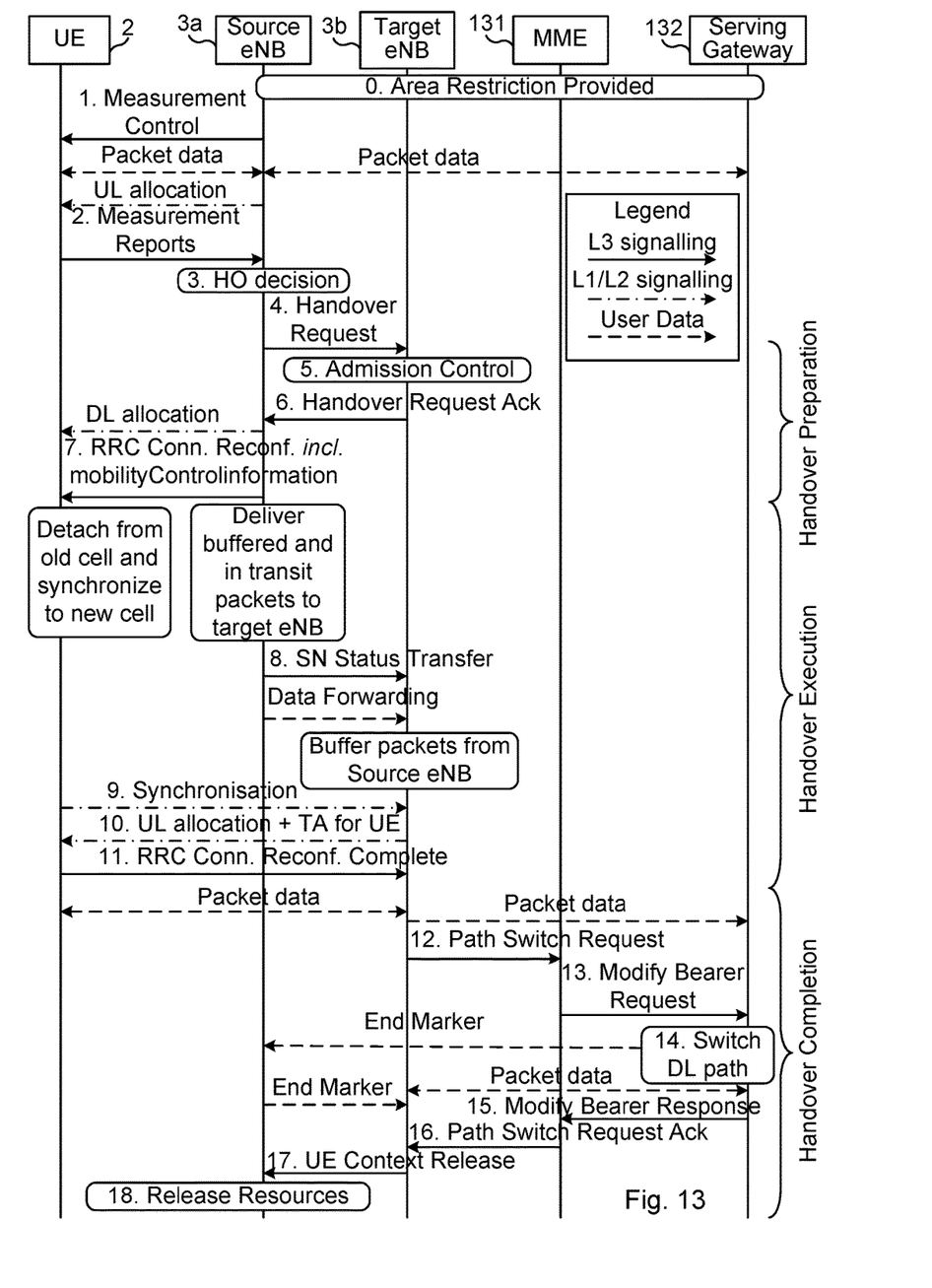
FIG. 13 is a signalling diagram for an intra LTE handover according to an example of the present disclosure.

FIG. 13 shows an example of a radio level handover. An MPTCP capable peer 2 in the form of a UE is to handed over from a source eNB 3a to a target eNB 3b of an LTE RAN 3. Shown are also a Mobility Management Entity (MME) 131 of the LTE core network (CN), and the serving gateway 132. This sequence flow is from 3GPP TS 36.300 (section 10.1.2.1 "Handover") and the details are explained further in that section.

The main principles of radio-level handovers are that mobility is network-controlled, and UE-assisted, and based on the following main principles:

1 The network may configure the UE 2 to provide measurement reports on the current and other cells and radio access technologies.

2 The UE 2 provides the measurements once the conditions provided as part of the measurement configuration are fulfilled.

3 The network (called source node 3a) takes the handover decision to a target cell handled by a target node 3b.

4 There is normally network side signalling between the source node 3a and target node 3b called handover preparation signalling.

5 As part of the handover preparation signalling, the target node 3b provides a "handover command" message that is transparently transmitted to the UE 2 via the source node 3a, and used by the UE to access the target cell handled by the target node (called also handover execution).

6 Additional signalling may take place both towards source node (to release resources) and core network (to inform about the handover) after the handover (called also handover completion).

Besides the handover approach outlined above, a UE 2 may re-select to another cell or radio access technology either by simply dropping the serving cell radio connection or alternatively by indicating it explicitly to the network first. In the former case, the serving network can detect that UE dropped the link through radio link monitoring functionality while in the latter case the network is obviously being made aware by the UE 2.

It is also possible that a UE 2 performs an intra-WLAN handover. In current specifications, the decision to handover to another WLAN access point (AP) is left to the UE. A typical setup is that multiple APs are controlled by a WLAN access controller (AC). The Institute of Electrical and Electronics Engineers (IEEE) has defined optimizations for fast AP-to-AP handovers within the domain of an AC (e.g. IEEE 802.11r-2008). In such a setup, the network will be aware that an AP-to-AP handover is on-going.

Embodiments of the present disclosure may advantageously be used for improved data transmission during a handover.

By means of the present disclosure, the currently known properties of MPTCP can be optimized by providing radio resource related information about for example radio level handovers to the MPTCP scheduler 61 for different actions.

The MPTCP scheduler 61 is provided with external radio resource related information from the radio level protocols. Typical examples are:

1 Handover soon on sub-flow X is likely,
2 Handover will happen on sub-flow X,
3 Handover has happened on sub-flow X,
4 "Will loose sub-flow X",
5 "loss of sub-flow X is likely",
6 "did loose sub-flow X"

The MPTCP scheduler 61 then takes different actions based on the radio level information, for example:

1 The MPTCP scheduler initiates dual-casting or multicasting so that all TCP packets/segments are sent temporarily on all TCP sub-flows.

2 The MPTCP scheduler minimizes the usage of a specific TCP sub-flow.

3 The MPTCP scheduler stops using a specific TCP sub-flow.

4 The MPTCP scheduler doesn't wait for a time-out of acknowledgement of traffic already sent over the lost access, but it immediately re-sends using another TCP sub-flow.

Figure 14:
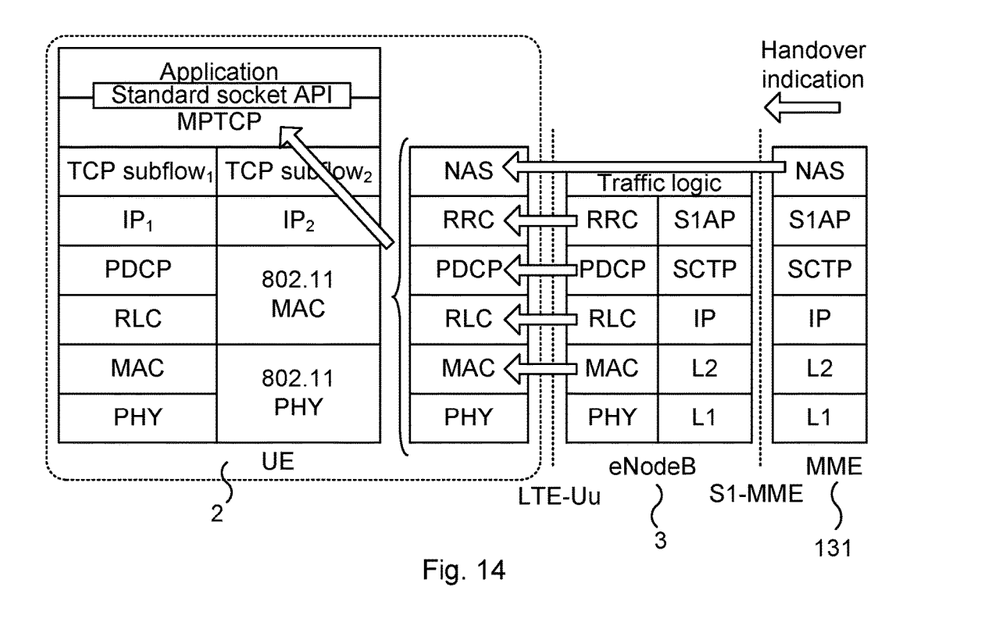
FIG. 14 is a schematic block diagram of respective protocol stacks in nodes involved in an intra LTE handover according to an example of the present disclosure.

FIG. 14 shows different examples on how the radio resource related information can be provided to the MPTCP scheduler 61. Initially the different LTE control plane protocol layers (any of the shown ones) may receive an indication from the network 1 or may detect something locally. FIG. 14 shows as example a "Handover indication" received from the network. Similar indications are also possible on the Wi-Fi/WLAN side.

Figures 15, 16:
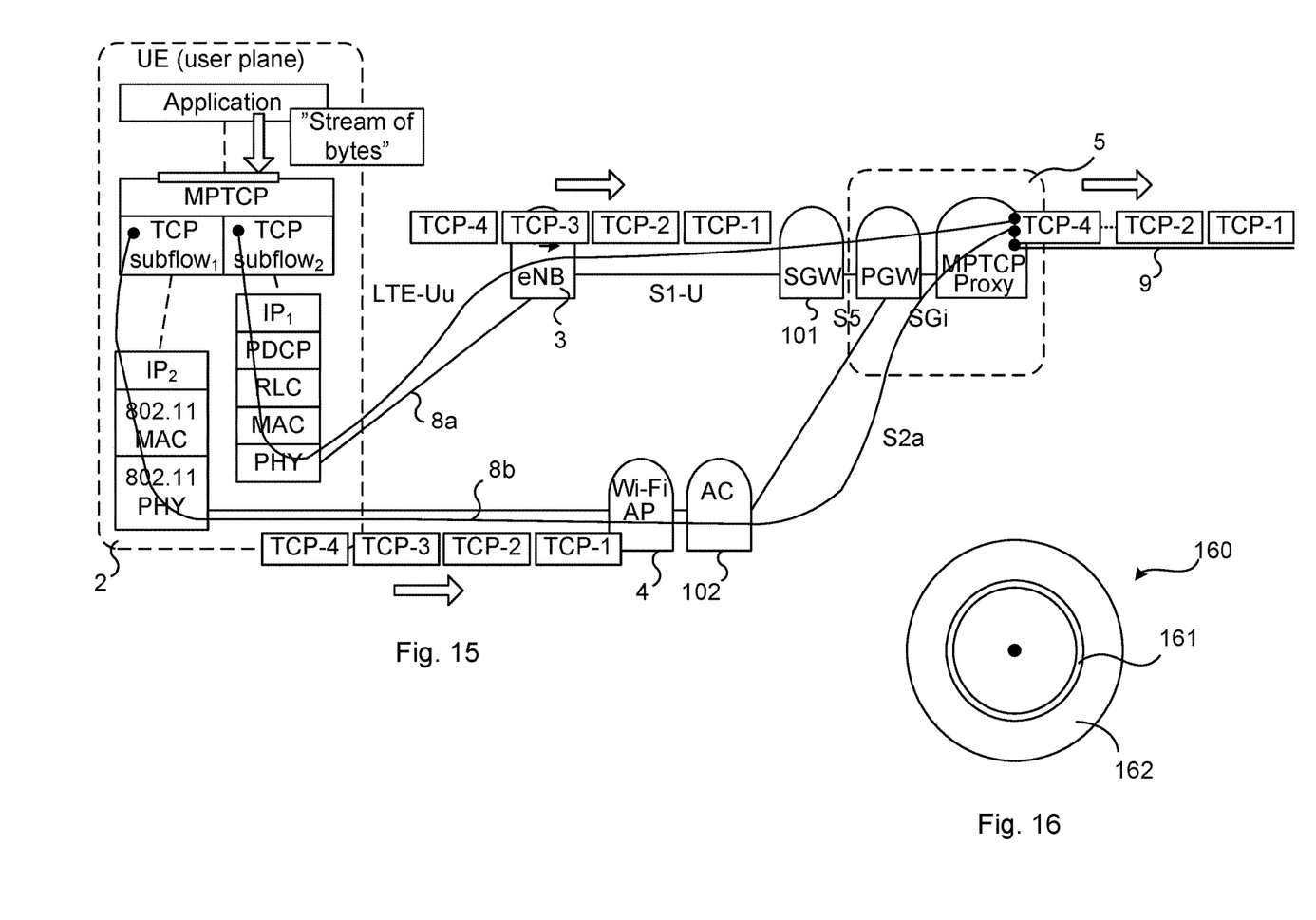
FIG. 15 is a schematic block diagram of an example embodiment of a communication network of the present disclosure, illustrating MPTCP dual-casting.
FIG. 16 is a schematic illustration of an embodiment of a computer program product of the present disclosure.

FIG. 15 shows an example of the case when the MPTCP scheduler 61 initiates dual-casting on both TCP sub-flows 8 (8a and 8b) after receiving for example the "Handover indication" shown in FIG. 14. FIG. 15 covers the MPTCP scheduler 61 in the UE 2, i.e. for uplink traffic. The same principles can apply for the MPTCP scheduler 61 in the proxy 5, i.e. for the downlink traffic. The entity that is aware of the upcoming handover or changed radio condition would then inform the proxy 5. This could e.g. be the eNB 3, MME 131, AP 4 or AC 102. The system-level information that is sent to the proxy 5 may e.g. be the handover/loss information mentioned above. Note that such system-level information could be sent either from the 3GPP RAN 3 or from the WLAN RAN 4 or both.

It will be understood that the LTE and WLAN examples given here are just examples—the same idea apply to any other type of RAN/RAT. Also, MPTCP is not restricted to use only two sub-flows 8, it may use only a single sub-flow 8 or more then two sub-flows 8.

Example 5—Computer Program Product

FIG. 16 illustrates a computer program product 160. The computer program product 160 comprises a computer readable medium 162 comprising a computer program 161 in the form of computer-executable components 161. The computer program/computer-executable components 161 may be configured to cause a scheduler 61, e.g. as discussed above for scheduling a TCP flow between a first peer 7 and an MPTCP capable second peer 2, to perform an embodiment of the method of the present disclosure. The computer program/computer-executable components may be run on the processor circuitry 62 of the scheduler 61 for causing the scheduler to perform the method. The computer program product 160 may e.g. be comprised in a storage unit or memory 63 comprised in the scheduler 61 and associated with the processor circuitry 62. Alternatively, the computer program product 160 may be, or be part of, a separate, e.g. mobile, storage means, such as a computer readable disc, e.g. CD or DVD or hard disc/drive, or a solid state storage medium, e.g. a RAM or Flash memory.

Below follows another aspect of the present disclosure.

According to an aspect of the present disclosure, there is provided an MPTCP scheduler 61 configured for scheduling a TCP flow between a first peer 7 and an MPTCP capable second peer 2. The scheduler comprises means 62 and 64 for setting up 91 the TCP flow comprising at least two sub-flows 8 connecting the MPTCP capable second peer 2, each sub-flow being associated with an address for the MPTCP capable second peer. The scheduler also comprises means 62 and 64 for receiving 92 external information relating to at least one of the at least two sub-flows 8. The scheduler also comprises means 62 for scheduling 93 data in the TCP flow based on the received 92 external information, wherein the scheduling 93 comprises choosing which sub-flow or sub-flows of the at least two sub-flows 8 to schedule the data via, based on the received 92 external information.

The present disclosure has mainly been described above with reference to a few embodiments. However, as is readily appreciated by a person skilled in the art, other embodiments than the ones disclosed above are equally possible within the scope of the present disclosure, as defined by the appended claims.

The invention claimed is:

1. A method performed in a Multipath Transmission Control Protocol (MPTCP) scheduler which is scheduling a Transmission Control Protocol (TCP) flow between a first peer and an MPTCP capable second peer, the method comprising:
setting up the TCP flow comprising at least two sub-flows connecting the MPTCP capable second peer, each sub-flow being associated with an address for the MPTCP capable second peer;
receiving external information relating to at least one of the at least two sub-flows, wherein the received external information comprises information that one of the at least two sub-flows will be terminated due to a handover; and
scheduling data in the TCP flow based on the received external information, wherein the scheduling comprises choosing which sub-flow or sub-flows of the at least two sub-flows to schedule the data based on the received external information, and the scheduling comprises choosing another sub-flow without waiting for an acknowledgement when the data has been lost due to termination of the one of the at least two sub-flows due to the handover.

2. The method of claim 1, wherein the received external information further comprises information that one of the at least two sub-flows is costly, and the scheduling comprises avoiding scheduling the data via the costly sub-flow.

3. The method of claim 1, wherein the received external information further comprises information that a specified sub-flow type is preferred, and the scheduling comprises scheduling the data via a sub-flow of the at least two sub-flows which is of the specified sub-flow type.

4. The method of claim 1, wherein the received external information further comprises information that a specified sub-flow type is preferred for a specified type of data, and the scheduling comprises scheduling the data of the specified type of data via a sub-flow of the at least two sub-flows which is of the specified sub-flow type.

5. The method of claim 1, wherein the scheduling, based on the received information of the sub-flow termination, comprises any of:
the MPTCP scheduler initiates multi-casting so that TCP packet(s) of the TCP flow are sent temporarily on a plurality of the sub-flows;
the MPTCP scheduler reduces the usage of the one of the at least two sub-flows;
the MPTCP scheduler stops using the one of the at least two sub-flows; or
the MPTCP scheduler re-sends TCP packet(s) already sent via the one of the at least two sub-flows via another of the at least two sub-flows without waiting for a time-out of acknowledgement of the already sent TCP packet(s).

6. The method of claim 1, wherein the MPTCP scheduler is part of an MPTCP proxy, and the scheduling comprises scheduling downlink (DL) data to the MPTCP capable second peer in the TCP flow.

7. The method of claim 6, wherein the setting up the TCP flow comprises setting up the TCP flow with only one sub-flow between the MPTCP proxy and the first peer.

8. The method of claim 6, wherein the MPTCP proxy additionally handles a plurality of additional TCP flows to a plurality of additional peers.

9. The method of claim 1, wherein the MPTCP scheduler is part of the MPTCP capable second peer, and the scheduling comprises scheduling uplink (UL) data from the MPTCP capable second peer in the TCP flow.

10. The method of claim 1, wherein at least one of the at least two sub-flows comprises a Wireless Local Area Network (WLAN) or a Radio Access Network (RAN).

11. The method of claim 1, wherein at least one of the at least two sub-flows comprises a cellular Radio Access Network (RAN).

12. A non-transitory computer-readable storage medium storing computer-executable components for causing a Multipath Transmission Control Protocol (MPTCP) scheduler to perform a method when the computer-executable components are run on processor circuitry comprised in the MPTCP scheduler, the method comprising:
setting up a Transmission Control Protocol (TCP) flow between a first peer and an MPTCP capable second peer, the TCP flow comprising at least two sub-flows connecting the MPTCP capable second peer, each sub-flow being associated with an address for the MPTCP capable second peer;

receiving external information relating to at least one of the at least two sub-flows, wherein the received external information comprises information that one of the at least two sub-flows will be terminated due to a handover; and scheduling data in the TCP flow based on the received external information, wherein the scheduling comprises choosing which sub-flow or sub-flows of the at least two sub-flows to schedule the data based on the received external information, and the scheduling comprises choosing another sub-flow without waiting for an acknowledgement when the data has been lost due to termination of the one of the at least two sub-flows due to the handover.

13. A Multipath Transmission Control Protocol (MPTCP) scheduler configured for scheduling a Transmission Control Protocol (TCP) flow between a first peer and an MPTCP capable second peer, the MPTCP scheduler comprising:
   processor circuitry; and
   a memory storing instructions that, when executed by the processor circuitry, cause the scheduler to:
      set up the TCP flow comprising at least two sub-flows connecting the MPTCP capable second peer, each sub-flow being associated with an address for the MPTCP capable second peer;
      receive external information relating to at least one of the at least two sub-flows, wherein the received external information comprises information that one of the at least two sub-flows will be terminated due to a handover; and
      schedule data in the TCP flow based on the received external information, wherein the scheduling comprises choosing which sub-flow or sub-flows of the at least two sub-flows to schedule the data based on the received external information, and the scheduling comprises choosing another sub-flow without waiting for an acknowledgement when the data has been lost due to termination of the one of the at least two sub-flows due to the handover.

14. An MPTCP proxy comprising the MPTCP scheduler according to claim 13.

15. A communication network comprising:
   an MPTCP proxy comprising the MPTCP scheduler according to claim 13; and
   a Radio Access Network (RAN) configured for providing a sub-flow in the TCP flow via the MPTCP proxy to each of a plurality of peers connected to the RAN.

16. An MPTCP capable second peer comprising the MPTCP scheduler according to claim 13.

17. A non-transitory computer-readable storage medium storing computer program code for scheduling a Transmission Control Protocol (TCP) flow, wherein the computer program code, when run on processor circuitry of a Multipath Transmission Control Protocol (MPTCP) scheduler, causes the MPTCP scheduler to:
   set up the TCP flow comprising at least two sub-flows to an MPTCP capable second peer, each sub-flow being associated with an address for the MPTCP capable second peer;
   receive external information relating to at least one of the at least two sub-flows, wherein the received external information comprises information that one of the at least two sub-flows will be terminated due to a handover; and
   schedule data in the TCP flow based on the received external information, wherein the scheduling comprises choosing which sub-flow or sub-flows of the at least two sub-flows to schedule the data based on the received external information, and the scheduling comprises choosing another sub-flow without waiting for an acknowledgement when the data has been lost due to termination of the one of the at least two sub-flows due to the handover.

\* \* \* \* \*

UNITED STATES PATENT AND TRADEMARK OFFICE
CERTIFICATE OF CORRECTION

PATENT NO. : 10,143,001 B2
APPLICATION NO. : 14/914106
DATED : November 27, 2018
INVENTOR(S) : Schliwa-Bertling et al.

Page 1 of 1

It is certified that error appears in the above-identified patent and that said Letters Patent is hereby corrected as shown below:

In the Specification

Column 8, Line 61, delete "scheduler 6i" and insert -- scheduler 61 --, therefor.

Column 9, Line 1, delete "scheduler 6i" and insert -- scheduler 61 --, therefor.

Column 9, Line 4, delete "scheduler 6i" and insert -- scheduler 61 --, therefor.

Column 9, Line 15, delete "scheduler 6i" and insert -- scheduler 61 --, therefor.

Column 9, Line 48, delete "scheduler 6i" and insert -- scheduler 61 --, therefor.

Signed and Sealed this
Second Day of April, 2019

Andrei Iancu
*Director of the United States Patent and Trademark Office*